UNITED STATES PATENT OFFICE.

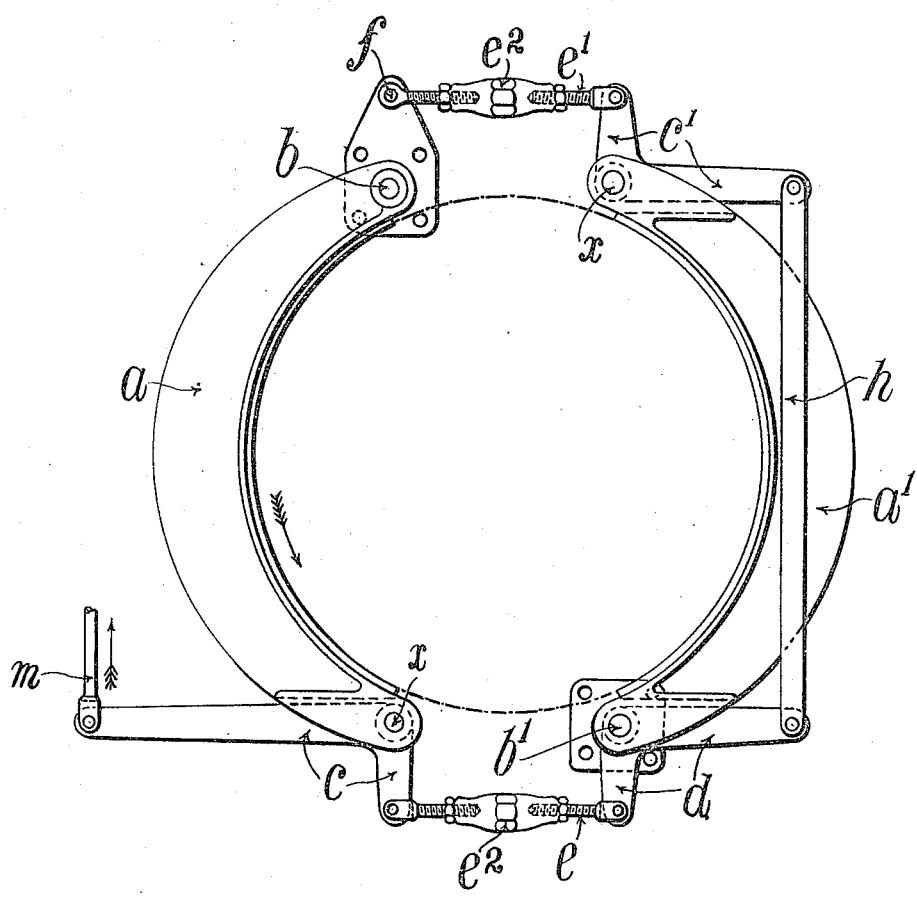

FREDERICK HENRY ROYCE, OF DERBY, ENGLAND.

BRAKE MECHANISM.

1,163,776. Specification of Letters Patent. Patented Dec. 14, 1915.

Application filed January 29, 1914. Serial No. 815,209.

*To all whom it may concern:*

Be it known that I, FREDERICK HENRY ROYCE, a subject of the King of Great Britain and Ireland, residing at Nightingale Road, Osmaston Road, Derby, in the county of Derby, England, have invented certain new and useful Improvements in and Relating to Brake Mechanism, of which the following is a specification, reference being had therein to the accompanying drawing.

This invention relates to brake mechanism of the external contracting shoe type, and has for its object to obtain equal brake shoe pressure, and equal reaction due to braking effect, and to maintain these conditions after wear of the parts. With brakes of this type the following disadvantages are usually manifest, either singly or in combination with each other:—first, the side pressure which is put on the brake drum shaft caused by the pressure of the brake shoes is not balanced; second, reaction due to brake effect caused by the brake shoes being so mounted that the revolving brake drum tends to drag one shoe on while it simultaneously thrusts the other and opposite shoe off. Although some brakes when first assembled are free from these defects they soon develop them after wear has taken place on the brake shoes, and the relative positions of the moving parts have become changed.

In accordance with the present invention, I provide a brake mechanism which will exert equal pressure on each side of the brake drum, thus relieving the shaft on which the drum is mounted of all side thrust or bending moment. In addition, I arrange the brake shoes in such a manner that the reaction due to braking effect is equal and opposite, thus again removing any tendency to side thrust on the shaft. Further, the mechanism is so arranged that after wear of the shoes has taken place the aforesaid conditions will not be altered, and any necessary adjustment can be made without altering said conditions.

I carry this invention into practical effect by arranging the brake shoe fulcrums diametrically opposite to one another, by making the leverage operating the shoes exactly equal, and by providing for the adjustment of the brake shoes by shortening two members of equal length. As the brake shoes are similarly mounted in their relation to the direction of rotation of the brake drum, an equal and opposite reaction (due to the braking effect) is set up on either side of the brake drum.

Referring to the accompanying drawing, which illustrates diagrammatically a brake mechanism constructed in accordance with the present invention, the brake shoes $a$ and $a^1$ are pivoted on fixed pins $b$ and $b^1$, said two pins being located diametrically opposite to one another. On the free ends of the brake shoes $a$ and $a^1$, which are contiguous to the fixed pins $b$ and $b^1$ are pivoted—by means of pins $x$—bell-crank levers $c$ and $c^1$ each of which has one limb longer than the other, and on the pin $b^1$ on which the brake shoe $a^1$ is pivoted is mounted another bell-crank lever $d$ which also has one limb longer than the other. The shorter limb of the bell-crank lever $c$ is coupled to the shorter limb of the bell-crank lever $d$ by means of a link $e$, and the shorter limb of the bell-crank lever $c^1$ is coupled by a link $e^1$ to a fixed pin $f$ mounted in suitable juxtaposition to the pin $b$ on which the brake shoe $a$ is pivoted. The longer limbs of the bell-crank levers $c^1$ and $d$ are coupled together by means of a link $h$ which preferably takes the form of two plates so as to straddle the brake shoe $a^1$. It will be understood that the shorter limbs of the bell-crank levers $c$ and $d$ are of the same length, and that the longer limbs of the bell-crank levers $c^1$ and $d$ are also of equal length.

The rod $m$ of the operating mechanism is connected to the free end of the longer limb of the bell-crank lever $c$. The links $e$ and $e^1$ are hinged to the limbs of the levers they connect, and each is capable of being adjusted in length by means of right or left hand nuts $e^2$ or equivalent devices.

Although I have described and shown the two limbs of the bell-crank levers as of unequal length, this is not obligatory.

The brake is operated by movement of the rod $m$ in the direction shown by the arrow—which causes the lever $c$ to turn on the pin $x$, and as the shorter limb of the bell-crank lever $c$ is connected to the shorter limb of the bell-crank lever $d$, which is pivoted on the fixed pin $b^1$, the effect is to cause the brake shoe $a$ to be thrust against the brake drum which rotates in the direction of the arrow and simultaneously to impart movement to the lever $d$, which operating through the link $h$ causes the bell-crank lever $c^1$ to turn on its pin $x$, and being anchored to the fixed pin $f$ causes the brake shoe $a^1$ also to be pressed against the brake drum.

It will be seen that the adjustment required to compensate for the wear of the brake shoes—which is accomplished by means of the right and left hand nuts $e^2$—does not alter the relative position of the bell-crank levers.

This invention is particularly suitable for use in connection with epicyclic change speed gear mechanism on account of its not throwing any side strain on the shaft carrying the brake drum or drums.

What I claim as my invention and desire to secure by Letters Patent is:—

A brake mechanism comprising two crescent-shaped brake shoes carrying a brake lining, fixed pins situated diametrically opposite to each other to one of which is pivoted the one end of one of the brake shoes and to the other fixed pin is pivoted the opposite end of the other brake shoe.

In testimony whereof I have signed my name in the presence of the two subscribing witnesses.

FREDERICK HENRY ROYCE.

Witnesses:
C. POPPLETON,
ALBERT GEORGE ELLIOTT.

Copies of this patent may be obtained for five cents each, by addressing the "Commissioner of Patents, Washington, D. C."